(12) United States Patent
Zhu et al.

(10) Patent No.: US 10,459,970 B2
(45) Date of Patent: Oct. 29, 2019

(54) METHOD AND SYSTEM FOR EVALUATING AND RANKING IMAGES WITH CONTENT BASED ON SIMILARITY SCORES IN RESPONSE TO A SEARCH QUERY

(71) Applicant: Baidu USA LLC, Sunnyvale, CA (US)

(72) Inventors: Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 464 days.

(21) Appl. No.: 15/175,584

(22) Filed: Jun. 7, 2016

(65) Prior Publication Data

US 2017/0351710 A1    Dec. 7, 2017

(51) Int. Cl.
*G06F 17/30* (2006.01)
*G06F 16/58* (2019.01)
(Continued)

(52) U.S. Cl.
CPC .......... *G06F 16/5866* (2019.01); *G06F 16/20* (2019.01); *G06F 16/24578* (2019.01); *G06F 16/951* (2019.01); *G06F 16/9535* (2019.01)

(58) Field of Classification Search
CPC ......... G06F 17/30268; G06F 17/30286; G06F 17/3053; G06F 17/30864; G06F 17/30867;
(Continued)

(56) References Cited

U.S. PATENT DOCUMENTS

| 8,090,222 B1 * | 1/2012 | Baluja | G06F 17/30247 |
| | | | 382/305 |
| 8,645,298 B2 * | 2/2014 | Hennig | G06N 7/005 |
| | | | 706/12 |

(Continued)

OTHER PUBLICATIONS

European Communication of the extended EP Search Report for counterpart EP Application No. P16201474.0 dated Apr. 4, 2017, 11 pages.

(Continued)

*Primary Examiner* — Mark E Hershley
(74) *Attorney, Agent, or Firm* — Womble Bond Dickinson (US) LLP

(57) ABSTRACT

According to one embodiment, a request is received for evaluating matching between a content item and an image that were identified and selected from a plurality of content items and images in response to a search query. First metadata associated with the content item, second metadata associated with the image, and third metadata associated with the search query are obtained. A first similarity score is determined based on the first metadata associated with the content item and the third metadata associated with the search query. A second similarity score is determined based on the second metadata associated with the image and the third metadata associated with the search query. An evaluation score is calculated for matching of the content item and the image in view of the search query. The evaluation score is utilized to identify subsequent content items and images in response to a subsequent search query.

27 Claims, 12 Drawing Sheets

(51) Int. Cl.
*G06F 16/9535* (2019.01)
*G06F 16/2457* (2019.01)
*G06F 16/20* (2019.01)
*G06F 16/951* (2019.01)

(58) Field of Classification Search
CPC .... G06F 16/5866; G06F 16/587; G06F 16/20;
G06F 16/24578; G06F 16/953; G06F
16/9535; G06F 16/951
USPC .......................................................... 707/723
See application file for complete search history.

(56) References Cited

U.S. PATENT DOCUMENTS

| | | | | |
|---|---|---|---|---|
| 8,775,436 | B1 | 7/2014 | Zhou et al. | |
| 8,923,655 | B1* | 12/2014 | Weston | G06F 17/30274 |
| | | | | 382/115 |
| 9,110,977 | B1* | 8/2015 | Pierre | G06F 17/30663 |
| 9,424,279 | B2* | 8/2016 | Li | G06F 17/30277 |
| 9,678,992 | B2* | 6/2017 | Wang | G06F 17/30265 |
| 9,870,376 | B2* | 1/2018 | Sanyal | G06F 17/30265 |
| 10,140,315 | B1* | 11/2018 | Hohwald | G06F 16/5838 |
| 2002/0038299 | A1 | 3/2002 | Zernik et al. | |
| 2005/0144162 | A1* | 6/2005 | Liang | G06F 17/30109 |
| 2006/0116994 | A1* | 6/2006 | Jonker | G06F 17/30017 |
| 2008/0109285 | A1* | 5/2008 | Reuther | G06F 17/30864 |
| | | | | 705/7.11 |
| 2009/0012863 | A1* | 1/2009 | Saephan | G06Q 30/02 |
| | | | | 705/14.54 |
| 2009/0290812 | A1* | 11/2009 | Naaman | G06F 17/30241 |
| | | | | 382/305 |
| 2010/0100546 | A1* | 4/2010 | Kohler | G06F 17/30017 |
| | | | | 707/739 |
| 2010/0131499 | A1* | 5/2010 | van Leuken | G06K 9/622 |
| | | | | 707/723 |
| 2010/0131500 | A1* | 5/2010 | van Leuken | G06K 9/622 |
| | | | | 707/723 |
| 2010/0306249 | A1* | 12/2010 | Hill | G06F 17/30867 |
| | | | | 707/769 |
| 2011/0029561 | A1* | 2/2011 | Slaney | G06F 17/30247 |
| | | | | 707/772 |
| 2011/0044549 | A1* | 2/2011 | Bressan | G11B 27/034 |
| | | | | 382/225 |
| 2011/0072048 | A1* | 3/2011 | Hua | G06F 17/30265 |
| | | | | 707/780 |
| 2011/0238608 | A1* | 9/2011 | Sathish | G06Q 30/02 |
| | | | | 706/47 |
| 2011/0302153 | A1* | 12/2011 | Meretakis | G06F 17/30864 |
| | | | | 707/722 |
| 2013/0018875 | A1* | 1/2013 | Qiao | G06F 17/30657 |
| | | | | 707/723 |
| 2013/0018894 | A1* | 1/2013 | Qiao | G06F 17/30719 |
| | | | | 707/748 |
| 2013/0142418 | A1* | 6/2013 | van Zwol | G06K 9/00751 |
| | | | | 382/159 |
| 2014/0201126 | A1* | 7/2014 | Zadeh | G06K 9/627 |
| | | | | 706/52 |
| 2014/0310255 | A1* | 10/2014 | Cardell | G06F 17/30864 |
| | | | | 707/706 |
| 2015/0081657 | A1* | 3/2015 | Yi | G06F 17/30672 |
| | | | | 707/706 |
| 2015/0161120 | A1* | 6/2015 | Preetham | G06F 17/30247 |
| | | | | 707/728 |
| 2017/0004383 | A1* | 1/2017 | Lin | G06F 17/30268 |
| 2017/0075974 | A1* | 3/2017 | Shetty | G06F 17/243 |
| 2017/0139916 | A1* | 5/2017 | Cama | G06F 17/30867 |
| 2017/0249367 | A1* | 8/2017 | Bergsma | G06F 3/0482 |
| 2017/0255693 | A1* | 9/2017 | Trifunovic | G06F 17/30268 |
| 2017/0293616 | A1* | 10/2017 | Li | G06F 17/30268 |

OTHER PUBLICATIONS

Alsumait et al., "Embedding Semantics in LDA Topic Models," in "Text Mining: Applications and Theory," May 3, 2010, Wiley, XP055358152, pp. 183-204.

* cited by examiner

| Keyword(s) | Image Identifier(s) |
|---|---|
| Flower | Image 1, Image 2, Image 3, Image 4, Image 5 |
| Beijing Flower | Image 1 |
| Shanghai Flower | Image 2 |
| Flower Delivery | Image 1, Image 2, Image 4 |
| 301 ... | 302 ... |

| Image ID | Keyword(s) |
|---|---|
| Image 1 | Flower, Beijing, Haidian District |
| Image 2 | Flower, Shanghai, Delivery |
| Image 3 | Flower, Delivery |
| 351 ... | 352 ... |

FIG. 3B

METHOD AND SYSTEM FOR EVALUATING AND RANKING IMAGES WITH CONTENT BASED ON SIMILARITY SCORES IN RESPONSE TO A SEARCH QUERY

FIELD OF THE INVENTION

Embodiments of the present invention relate generally to searching content. More particularly, embodiments of the invention relate to searching content with matching images based on similarity scores in response to a search query.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. A conventional search engine would return most of the content items as is without modifying. Some of the content items in the search result are just plain text or description, which may deem to be unattractive or boring. Sometimes content in a search result would be more presentable or attractive if the content items are prepared with certain images that are related to the content items. However, it is quite challenge to match appropriate images with content items. There has been a lack of efficient ways to match content with images and to evaluate the matching of content and images.

BRIEF DESCRIPTION OF THE DRAWINGS

Embodiments of the invention are illustrated by way of example and not limitation in the figures of the accompanying drawings in which like references indicate similar elements.

FIGS. 3A-3B are examples of query-image matching tables according to certain embodiments of the invention.

DETAILED DESCRIPTION

Figure 1A:
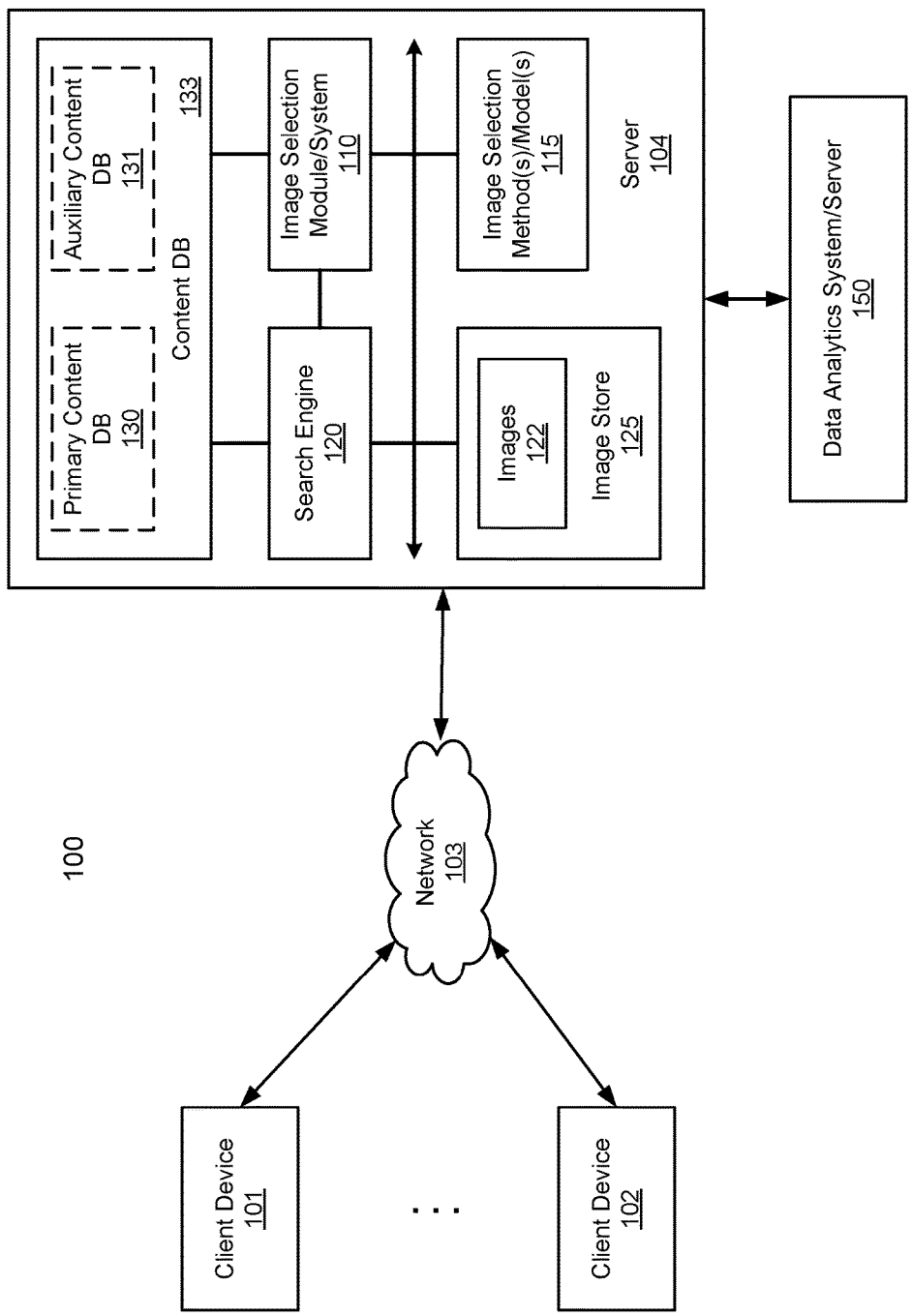
FIGS. 1A and 1B are block diagram illustrating an example of system configuration for matching images with content items according to some embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a content item and an image are received, where the content item and the image were identified in response to a search query. Similarity scores amongst the content item, the image, and the search query are calculated. The similarity scores include a similarity score between the search query and the image, a similarity score between the search query and the content item, and a similarity score between the content item and the image. The similarity scores represent relationships amongst the search query, the content item, and the image (e.g., how similar or compatible amongst the parties). An evaluation score or ranking score is determined for matching the content item with the image based on the similarity scores amongst the content item, the image, and the search query. The evaluation score may be utilized to evaluate a result of matching the content item and the image, which have been performed in the past to determine (e.g., offline) whether a matching method or model needs to be adjusted or improved. The same mechanism can be utilized to dynamically rank the paring between a content item and an image in real-time in response to a search query, e.g., online image selection or ranking.

According to one aspect of the invention, in response to a request for evaluating matching of a content item and an image that were identified in response to a search query, metadata associated with the content item, the image, and the search query is obtained. A first similarity score is determined based on the metadata associated with the content item and the search query. A second similarity score is determined based on the metadata associated with the image and the search query. An evaluation score for evaluating the matching between the content item and the image is calculated based on the first and second similarity scores. In one embodiment, the evaluation score may be determined further based on a third similarity score that is determined based on the metadata associated with the content item and the image. The evaluation score may be utilized to adjust the selection methods or algorithms in subsequent matching of content items and images in response to subsequent search queries.

According to another aspect of the invention, a content item and a list of images that have been identified in response to a search query are received. For each of the images, a first similarity score is determined based on metadata associated with the content item and the search query. A second similarity score is determined based on metadata associated with the image and the search query. A ranking score is calculated for the image based on the first similarity score and the second similarity score. The images are then ranked based on their respective ranking scores to select one of the images to be associated with the content item. In one embodiment, a third similarity score is determined based on metadata associated with the content item and the image. The ranking score for the image is calculated further based on the third similarity score.

Figure 1B:
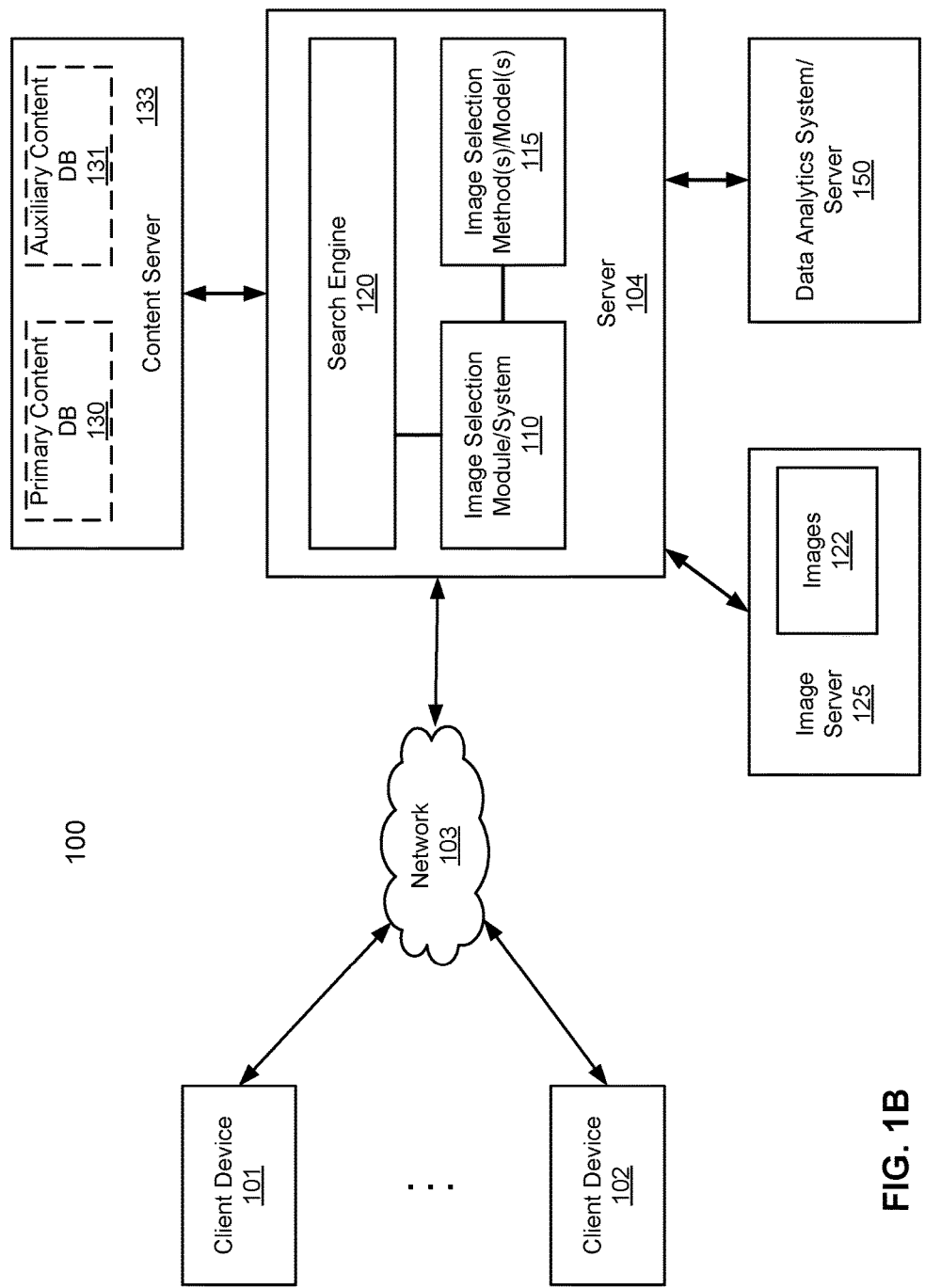

FIGS. 1A and 1B are block diagram illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or a cluster of servers, such as Web or cloud servers, application servers, backend servers, or a combination thereof. In one embodiment, server 104 includes, but is not limited to, search engine 120, image selection module 110, and image selection method(s) or model(s) 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a user application of client device 101 (e.g., Web browser, mobile application), may send a search query to server 104 and the search query is received by search engine 120 via the interface over network 103. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords. Primary content database 130 (also referred to as a master content database) may be a general content database, while auxiliary content database 131 (also referred to as a secondary or accessory content database) may be a special content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items. Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content). Auxiliary content database 135 stores specific or special content items that are associated with specific, known, or predetermined content providers (e.g., sponsored content). Alternatively, content database 133 may be implemented as a single database without distinguishing primary content database 131 from auxiliary content database 132.

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

In addition, according to one embodiment, image selection module or system 110 identifies based on the keywords associated with the search query, using image selection method(s) or model(s) 115, a list of image IDs identifying images that are related to the keywords associated with a search query. Image selection methods/models 115 may include a keyword-to-image (keyword/image) mapping table (not shown), which may be implemented in a variety of data structures such as a table or database. Based on the image IDs, a list of image candidates can be identified and retrieved from images 123 stored in image store 125, where image store 125 may also store image metadata describing images 122 (not shown).

In one embodiment, images 122 and their respective metadata may be obtained by one or more image or network crawlers that are designed to craw the networks to collect images as well as their surrounding metadata. Images 122 may be non-privileged, non-copyrightable, properly licensed images, or any other authorized images. The image candidates may be ranked based on a ranking score between the keywords and the image candidates, as well as metadata of the content items. For each of the content items found in content database 133, an image is selected from the list of image candidates to be associated with the content item. The selected image may be incorporated with the content item to generate an incorporated or composite content item. For example, the selected image may serve as a background image to the content item. The list of incorporated content items and images is returned to client device 101 as part of a search result.

According to one embodiment, image selection methods/models 115 may be previously configured and generated prior to receiving the search query (e.g., offline), which may include a keyword-to-image (keyword/image) mapping table. The keyword/image mapping table includes a number of mapping entries, each mapping entry mapping a keyword to one or more image IDs, or vice versa, as shown in FIGS. 3A-3B for example. The keywords may be identified as the keywords that are more likely used in search queries and/or keywords associated with certain content items (e.g., bidwords of sponsored content). Such keywords may be identified based on an analysis or tracking of user searching activities or search history, which may be compiled for a period of time.

Subsequently when a search query is received at run-time by search engine 120 from a client device for searching content, a search is performed in content database 133 to retrieve a list of content items. In addition, an analysis is performed, for example, by image selection module 110, on the search query to determine one or more keywords associated with the search query. The determined keywords may be the keywords included in the search query. The determined keywords may further include certain keywords that are semantically similar or have the same meaning of the keywords originally in the search query (e.g., synonymous words or phrases). Based on the keywords, a list of one or more images are identified from image store 125 using the keyword/image mapping table as part of image selection methods/models 115.

According to one embodiment, the identified images may be ranked by image selection module 110, using a variety of ranking algorithms or ranking models as part of image selection methods/models 115, which have been generated and configured by data analytics system 150 (also referred to as a query/image mapping system). For each of the images that are identified as image candidates to be matched with a content item, similarity scores between each pair of the search query, the content item, and the image are determined, for example, using a specific scoring algorithm or method. A final ranking score is determined based on the similarity scores representing the relationships amongst the content item, the search query, and the image. The image candidates are then ranked based on their respective ranking scores. One of the images is then selected to be matched with the content item.

According to another embodiment, the same or similar scoring methods or models can be utilized to evaluate the results of prior matching of content items and images. The evaluation may be performed offline by data analytics system or server 150 based on the data of prior content/image matching processes. The evaluation may be utilized to further adjust the image selection methods/models 115 for future image selections.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server), and to match and/or integrate images with content items of a content database or server. Data analytics system 150 may also be implemented as a separate server, which is responsible for creating or training image selection methods/models 115 based on the content items and their respective associated keywords of content database or server 133.

Other architectures or configurations may also be applicable. For example, as shown in FIG. 1B, content database 133 may be maintained and hosted in a separate server as a content server over a network. Similarly, image store 125 may be maintained and hosted in a separate server as an image server having an image searching engine therein. Servers 133 and 125 may be Web servers, application servers, or backend servers. Content server 133 and/or image server 125 may be organized and provided by the same entity or organization as of server 104. Alternatively, content server 133 and/or image server 125 may be maintained or hosted by separate entities or organizations (e.g., third-party providers), which are responsible for collecting contents in content databases 130-131 and images 122 and their metadata.

Also note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary or accessory content server. The content items obtained from both content databases 130-131 may be matched with images obtained from image store/server 125 using a variety of matching formulas. Alternatively, only content items obtained from one of primary content database 130 and auxiliary content database 131 will be matched with images obtained from image store/server 125. For example, content items obtained from auxiliary content database 131 (e.g., sponsored content) will be matched with the images obtained from image store/server 125, while content items obtained from primary content database 130 (e.g., general content) will be returned to the client device without modification as part of the search result.

Figure 2:
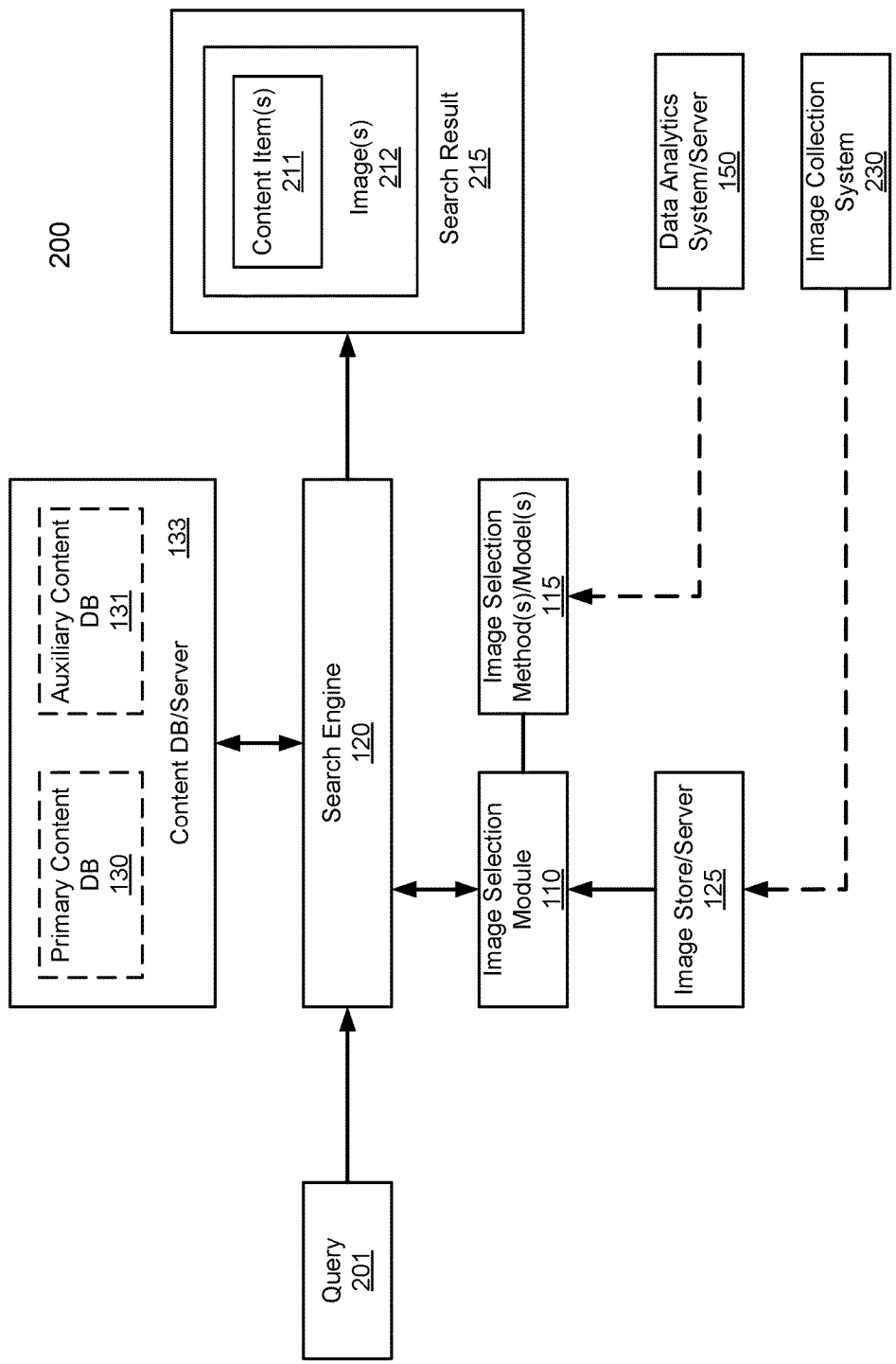
FIG. 2 is a block diagram illustrating an example of an image selection system according to one embodiment of the invention.

FIG. 2 is a block diagram illustrating a system for matching images with content items according to one embodiment of the invention. System 200 may be implemented as part of system 100 of FIGS. 1A-1B. Referring to FIG. 2, when search query 201 is received from a client device (e.g., client device 101 of FIG. 1), search engine 120 performs a first search in content database or content server 133 to identify and retrieve a first list of content items based on one or more keywords or search terms associated with search query 201. In addition, search engine 120 communicates with image selection module 110 to identify a list of images from image store or image sever 125 based on the keywords associated with search query 201 using a set of image selection methods/models 115. Search engine 120 and/or image selection module 110 may perform an analysis on the query to derive a list of keywords that are included in search query 201 and/or similar to the keywords in search query 201 (e.g., semantically similar terms, synonymous terms). The searches performed in content database/server 133 and/or image store/server 125 may be performed on the list of expanded keywords.

In one embodiment, image selection module 110 and/or image selection methods/models 115 may be integrated with search engine 120. Image selection methods/models 115 may be previously configured or compiled, for example, by query/image mapping system 150. Query/image mapping system 150 may be hosted in a separate system or server communicatively coupled to system 200 via an API or over a network. Query/image mapping system 200 may include a user interface to allow a user or an administrator to configure a set of query/image matching rules, which may then be expanded and ranked using a predetermined algorithm by processing logic. Further details of query/image mapping system 200 will be described further below.

Similarly, images stored in image store/server 125 may be collected by image collection system 230, which may be a separate system or server communicatively coupled to system 200 over a network. Query/image mapping system 150 and/or image collection system 230 may be operated by the same or different entity or organization as of system 200. In this example, images may be cached and stored in a local image store with respect to system 200 (e.g., local to server 104). Alternatively, images may be maintained by a designated server associated with image collection system 230, with which image selection module 110 communicates to identify and retrieve the list of images via API.

Based on the list of images retrieved from image store/server 125, image selection module 110 ranks the images according to a ranking algorithm, for example, based on similarity scores amongst the content items, the images, and the search query. Some of the images are then matched with some of the content items identified and retrieved from content database/server 133. The matched content items and images are then integrated into integrated content items. In one embodiment, an image may be selected as a background image or a complementary image to a content item. For example, content item 211 may be a description or text and image 212 may be selected to be a background image for content item 211. Image 212 is selected based on the matching or ranking techniques described throughout this application to complement or describe content item 211, or vice versa, in an appropriate manner. For example, the content of content item 211 is related to the content as shown in image 212, or vice versa. The integrated images 212 and content items 211 may be returned to the client device as a part of search result 215.

According to one embodiment, in response to search query 201 received from a client device, one or more keywords are determined based on search query 201, where the keywords may include those in search query 201 or those expanded based on an analysis on search query 201. Based on the keywords, a lookup operation or search is performed in image selection methods/models 115, which may be implemented in a variety of data structures, such as, for example, a database or a table.

Image selection methods/models 115 includes a keyword/image mapping table having a number of mapping entries. Each mapping entry maps one or more keywords to one or more image IDs that identify one or more images stored in image store/server 125. Based on the keywords obtained based on search query 201, a list of one or more image IDs may be obtained based on image selection methods/models 115. Based on the image IDs, the corresponding images are obtained from image store/server 125 as image candidates. The image candidates are then ranked and matched using one or more predetermined ranking and/or matching algorithms, which will be described in details further below. The top ranked images may then be selected to be associated with the content items for integration as part of search result 215. Note that some or all of the components or modules as shown in FIG. 2 may be implemented in software, hardware, or a combination thereof.

FIGS. 3A-3B are examples of query-image matching tables according to certain embodiments of the invention. Referring to FIG. 3A, query/image matching table 300 may represent a query/image mapping table as part of image selection methods/models 115 of FIGS. 1A-1B and 2 as described above. In one embodiment, query/image matching table 300 includes a number of matching entries. Each of the matching entry maps one or more keywords 301 to one or more image IDs 302, where image IDs 302 identify the corresponding images in an image store or image server, such as image store/sever 125. Matching table 300 is indexed based on the keywords. In this example, a first entry maps a term "flower" to images 1-5. A second entry maps a term "Beijing flower" to image 1 only. A third entry maps a term "Shanghai flow" to image 2. A fourth entry maps a term "flower delivery" to images 1-2 and 4. Thus, if a search query contains "Beijing flower," images 1-5 may be identified. However, image 1 may have a higher ranking.

Referring now to FIG. 3B, which is an example of an alternative embodiment of a matching table, this is an image-keyword (image/keyword) matching table that may be utilized as part of image selection methods/models 115. In this example, image/keyword matching table 350 includes a number of matching entries. Each matching entry maps an image ID 351 to one or more keywords 352. Matching table 350 is indexed based on image IDs. Both tables 300 and 350 may be utilized interchangeably. For example, table 300 may be used to identify all of the images that are related to one or more keywords.

Figure 4:
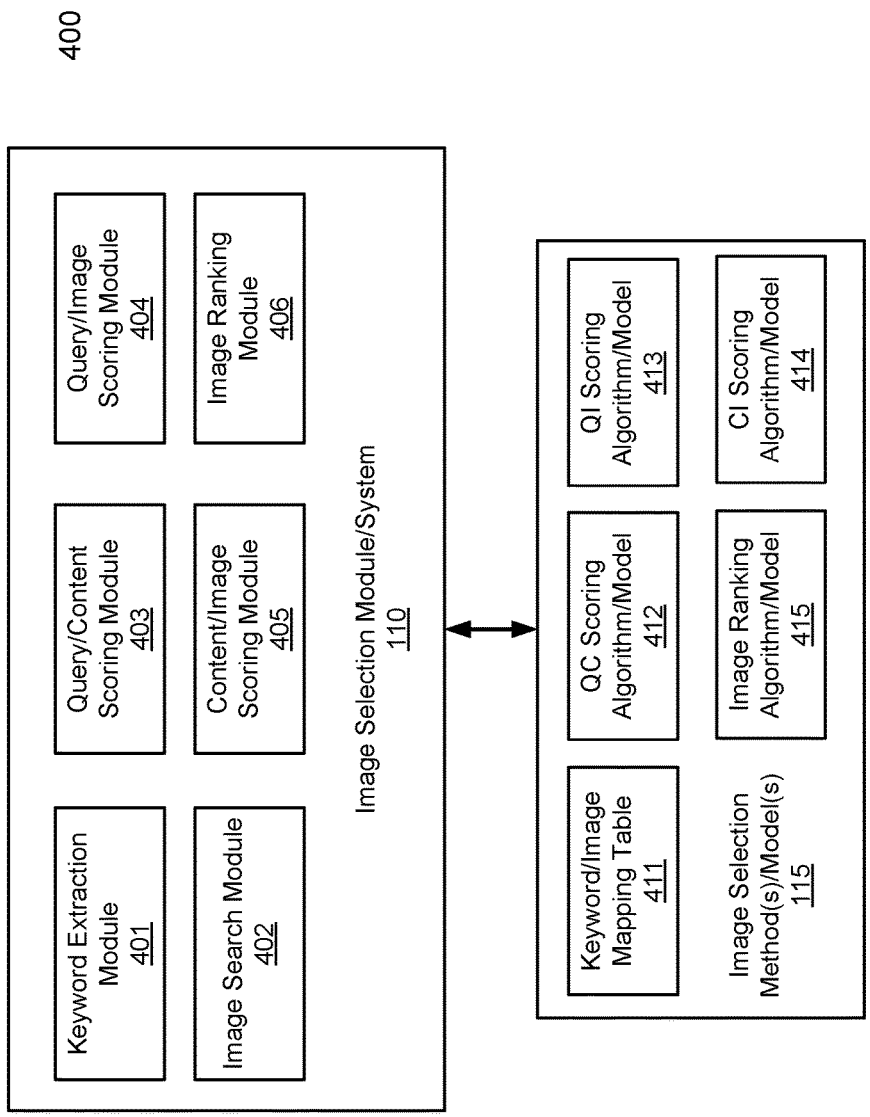
FIG. 4 is a block diagram illustrating an example of image selection system according one embodiment of the invention.

FIG. 4 is a block diagram illustrating an example of image selection system according to one embodiment of the invention. System 400 may be implemented as part of system 100 or system 200 of FIGS. 1A-1B and 2. Referring to FIG. 4, image selection module or system 110 includes, but is not limited to, keyword extraction module 401, image search module 402, query-content (QC) scoring module 403, query-image (QI) scoring module 404, content-image (CI) scoring module 405, and image ranking module 406. Scoring modules 403-405 are configured to determine similarity scores representing the relationships amongst the content items, images, and a corresponding search query for ranking purposes. Scoring modules 401-406 may be implemented in software, hardware, or a combination thereof. For example, scoring modules 401-406 may be loaded in a memory and executed by one or more processors.

Figure 5:
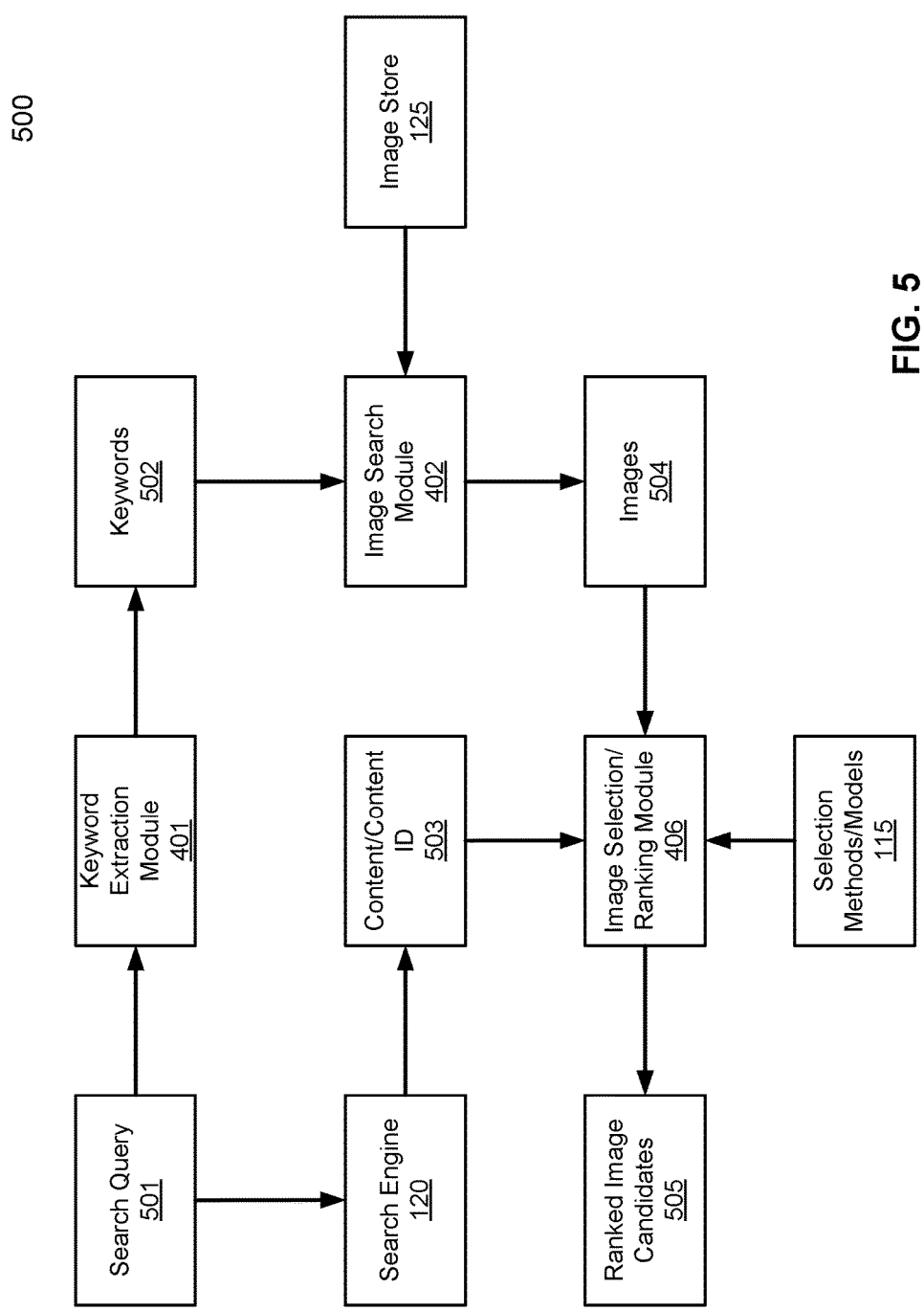
FIG. 5 is a processing flow of matching and ranking images with a content item according to one embodiment.

Referring now to FIGS. 4-5, in response to search query 501 or search terms of search query 501, keyword extraction module 401 (also referred to as a query analysis module) performs an analysis on the search terms to derive a set of keywords 502 that are associated with the search terms of search query 501. Keywords 502 may be those included in the search terms of search query 501. Alternatively, keywords 502 may further include additional keywords that are semantically related to the search terms of search query 501, which may be determined based on the analysis. For example, keyword extraction module 401 may perform a latent semantic analysis on the search terms to derive additional keywords that are semantically related to the search terms of search query 501. The analysis may also remove some of the keywords from search query 501 that deem to be unrelated to contradict to an intent of a search requester.

A latent semantic analysis (LSA) is a technique in natural language processing, in particular distributional semantics, of analyzing relationships between set of documents and the terms they contain by producing a set of concepts related to the documents and terms. LSA assumes that words that are close in meaning will occur in similar pieces of text. A matrix containing word counts per paragraph (rows represent unique words and columns represent each paragraph) is constructed from a large piece of text and a mathematical technique called singular value decomposition (SVD) is used to reduce the number of rows while preserving the similarity structure among columns. Words are then compared by taking the cosine of the angle between the two vectors (or the dot product between the normalizations of the two vectors) formed by any two rows. Values close to 1 represent very similar words while values close to 0 represent very dissimilar words.

Based on keywords 502, image search module 402 searches in image store 125 to obtain a list of images 504 as image candidates, as well as their associated metadata. Image search module 402 may look up in a keyword/image mapping table based on keywords 502 to identify a list of image IDs that identify images 504. For each of the images 504, image selection/ranking module 406 invokes the scoring modules 403-405 to determine the similarity scores amongst the content item identified by content ID 503, the image, and search query 501, using the proper scoring algorithms or models obtained from selection methods/models 115 as described above. A final ranking score for each image is calculated based on the associated similarity scores. The images are then ranked by their respective ranking scores to generated ranked image candidates 505.

Figure 6:
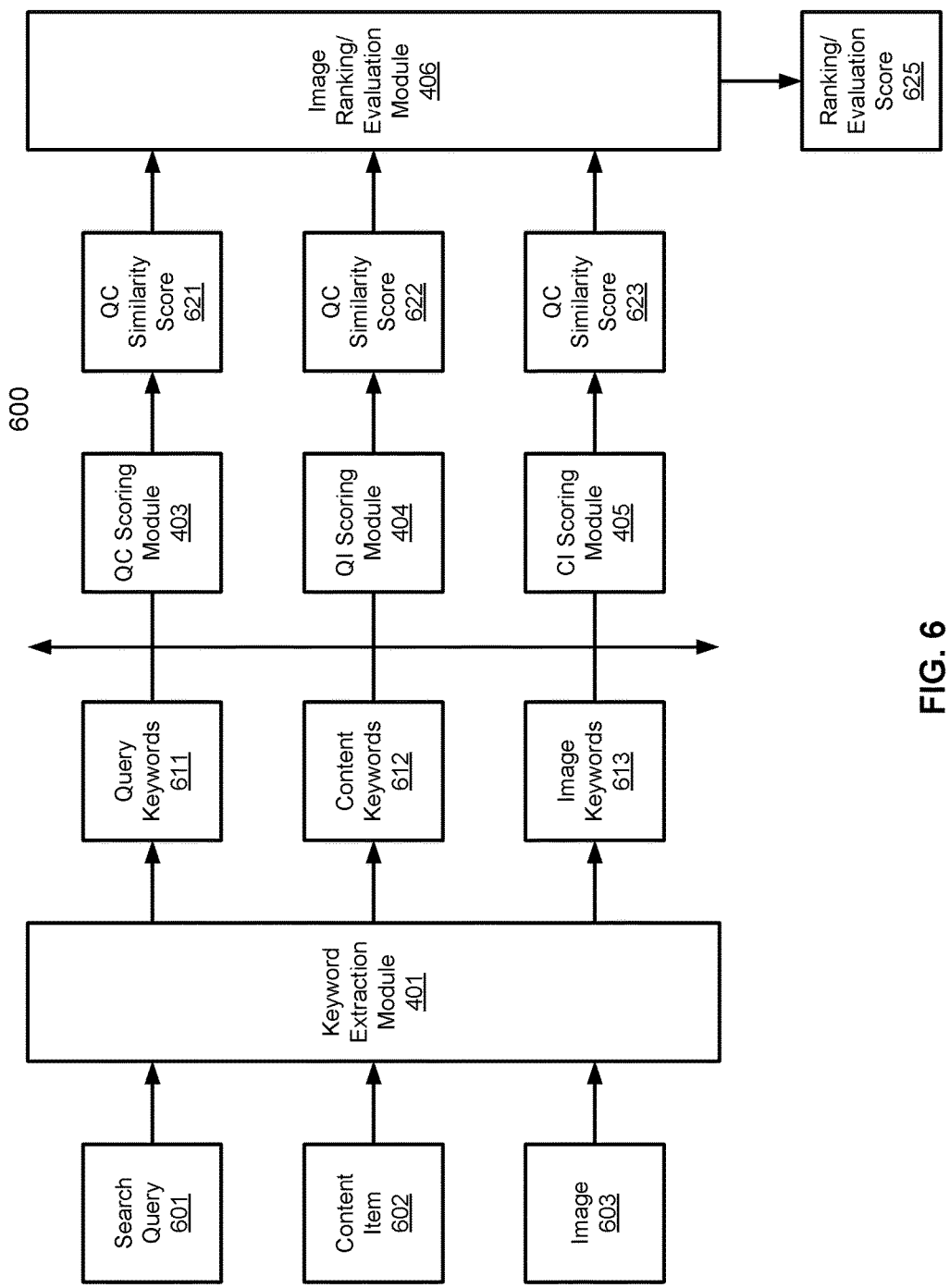
FIG. 6 is a block diagram illustrating a processing flow of ranking images according to another embodiment of the invention.

FIG. 6 is a block diagram illustrating a processing flow of ranking images according to another embodiment of the invention. Referring to FIG. 6, in one embodiment, in response to content item 602 and image 603 that have been identified in response to search query 601, keyword extraction module 401 extracts or determines keywords 611-613 associated with search query 601, content item 602, and image 603, respectively. The keywords may be included in search query 601, content item 602, and image 603. Alternatively, the keywords may further include similar keywords or semantically related keywords that are determined based on an analysis (e.g., latent semantic analysis), for example on metadata 604 associated with search query 601, content item 602, and image 603.

Keywords 612 associated with content item 602 may be obtained based on the title, description, a landing page, as well as other metadata associated with content item 602. Keywords 613 associated image 603 may be obtained from its title and context associated with image 603, including a source from which image 603 was obtained and/or content recognized from image 603 (e.g., object, scene, theme represented by the image). A source from which an image is obtained may be a Web page or a document in which the image is attached. An address such as a universal resource locator (URL) of the source page may be collected. In addition, an analysis may be performed on the content of the source page to determine the content possibly represented by the image. An image recognition may also be performed on the image to determine the content of the image (e.g., whether the image is about a person, an object, landscape, texts, or a combination thereof).

Keyword extraction module 401 may further process the keywords to remove certain keywords that are not relevant. In one embodiment, keyword extraction module 401 segments the keywords, determines the word frequency, and/or performs a term frequency-inverse document frequency (TF-IDF) operation on the segmented keywords. As a result, certain unrelated words may be removed. For example, words that occur more often (e.g., "a," "the," "of," etc.) may be removed. Certain words that are related to time or a geographic location (e.g., "San Jose") may also be removed.

Based on keywords 611-613, QC scoring module 403 determines QC similarity score 621 based on the keywords 611 and/or other metadata associated with the search query 601 and the content item 602, using QC scoring algorithm or model 412. QI scoring module 404 determines QI similarity score 622 based on the keywords 612 and/or other metadata associated with the search query 601 and the image 603, using QI scoring algorithm or model 413. CI scoring module 405 determines CI similarity score 623 based on the keywords 613 and/or other metadata associated with the content item 602 and the image 603, using CI scoring algorithm or model 414. Based on the QC, QI, and CI similarity scores, image ranking module 406 determines ranking score 625 for image 603 to be paired with content item 602, for example, using ranking algorithm or model 415. All of the image candidates are then ranked based on their respective ranking scores. These similarity scores are also referred to as two-dimensional (2D) scores, since they are determined based on two set of keywords associated with two parties.

In one embodiment, in determining a similarity score, a probabilistic latent semantic analysis (PLSA), as part of scoring algorithms 412-414, is performed on the corresponding sets of keywords. PLSA, also known as probabilistic latent semantic indexing (PLSI, especially in information retrieval circles), is a statistical technique for the analysis of two-mode and co-occurrence data. In effect, one can derive a low-dimensional representation of the observed variables in terms of their affinity to certain hidden variables, just as in latent semantic analysis, from which PLSA evolved. Probabilistic latent semantic analysis is based on a mixture decomposition derived from a latent class model.

In one embodiment, referring back to FIG. 6, an individual ranking score (e.g., a 3D score) for each of search query 601, content item 602, and image 603 is determined based on the 2D similarity scores. For example, an individual ranking score can be calculated based on a product of two 2D similarity scores. The ranking score for search query 601 is determined based on QC sore 621 and QI score 622. In one embodiment, the ranking score for search query 601 is calculated by:

$$S_{query}=QC^{\delta 1}*QI^{\delta 2}$$

where QC and QI represent QC and QI similarity scores. δ1 and δ2 are coefficients or weight factors associated with search query 601 and content item 602, which may be greater than 1.

In one embodiment, the ranking score for content item 602 is determined based on QC score 621 and CI score 623. In one embodiment, the ranking score for content item 602 is calculated by:

$$S_{content}=QI^{\delta 1}*CI^{\delta 3}$$

where QC and CI represent QC and CI similarity scores. δ1 and δ3 are coefficients or weight factors associated with search query 601 and image 603, which may be greater than 1.

In one embodiment, the ranking score for image 603 is determined based on QI score 622 and CI score 623. In one embodiment, the ranking score for image 603 is calculated by:

$$S_{image}=IQ^{\delta 2}*CI^{\delta 3}$$

where QI and CI represent QI and CI similarity scores. δ2 and δ3 are coefficients or weight factors associated with content item 602 and image 603, which may be greater than 1.

In one embodiment, the final ranking score for matching content item 602 with image 603 in view of search query 601 is determined based on the individual ranking scores for search query 601, content item 602, and image 603. In a particular embodiment, the final ranking score is calculated based on the followings:

$$S_{final}=(S_{query}+S_{content}+S_{image})/3$$

According to another embodiment, the algorithms and ranking mechanism described above can also be utilized to evaluate the prior matchings amongst the content items and images in response to certain search queries to determine whether the matchings are performed properly. Such evaluation can be utilized to adjust the matching methods for subsequent matchings.

Figure 7:
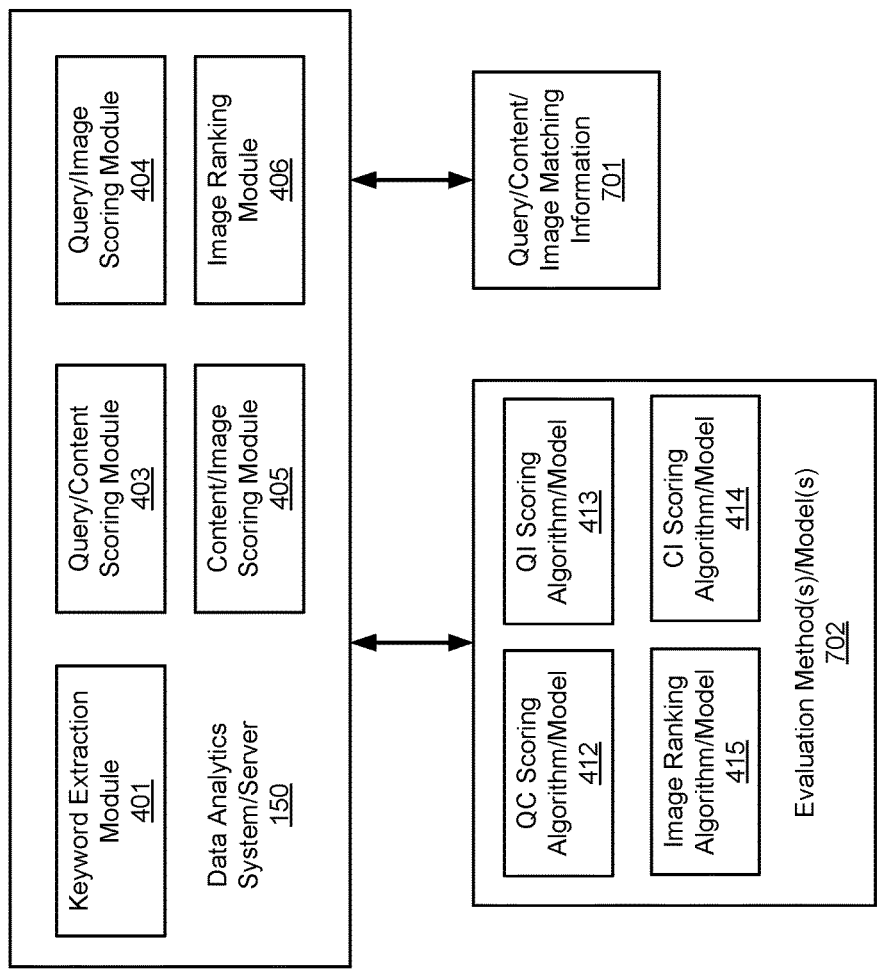
FIG. 7 is a block diagram illustrating an example of a data analytics system for evaluating the matchings between content and images according to one embodiment of the invention.

FIG. 7 is a block diagram illustrating an example of a data analytics system for evaluating the matchings between content and images according to one embodiment of the invention. Referring to FIG. 7, data analytics system 150 includes keyword extraction module 401, QC scoring module 403, QI scoring module 404, CI scoring module 405, and evaluation module 406. Modules 401 and 403-406 may have the same or similar functionalities as the corresponding modules as shown in FIG. 4. For the purpose of illustration, the same reference numbers are maintained. Modules 401 and 403-406 perform the same or similar operations as those described with respect to FIG. 6. For example, modules 401 and 403-406 perform the same or similar operations associated with FIG. 6 for evaluating matchings of content items and images based on matching information 701 of known matched content items and images in response to known search queries, using proper scoring algorithms 412-415 as part of evaluation methods 702. The evaluation score is utilized determine the quality of prior matching of content items and images. If a particular individual ranking score is below a predetermined threshold, it indicates that there may be an issue with respect to the corresponding party. For example, if the ranking score for the image is too low, that image needs to be improved for subsequent matching.

Figure 8:
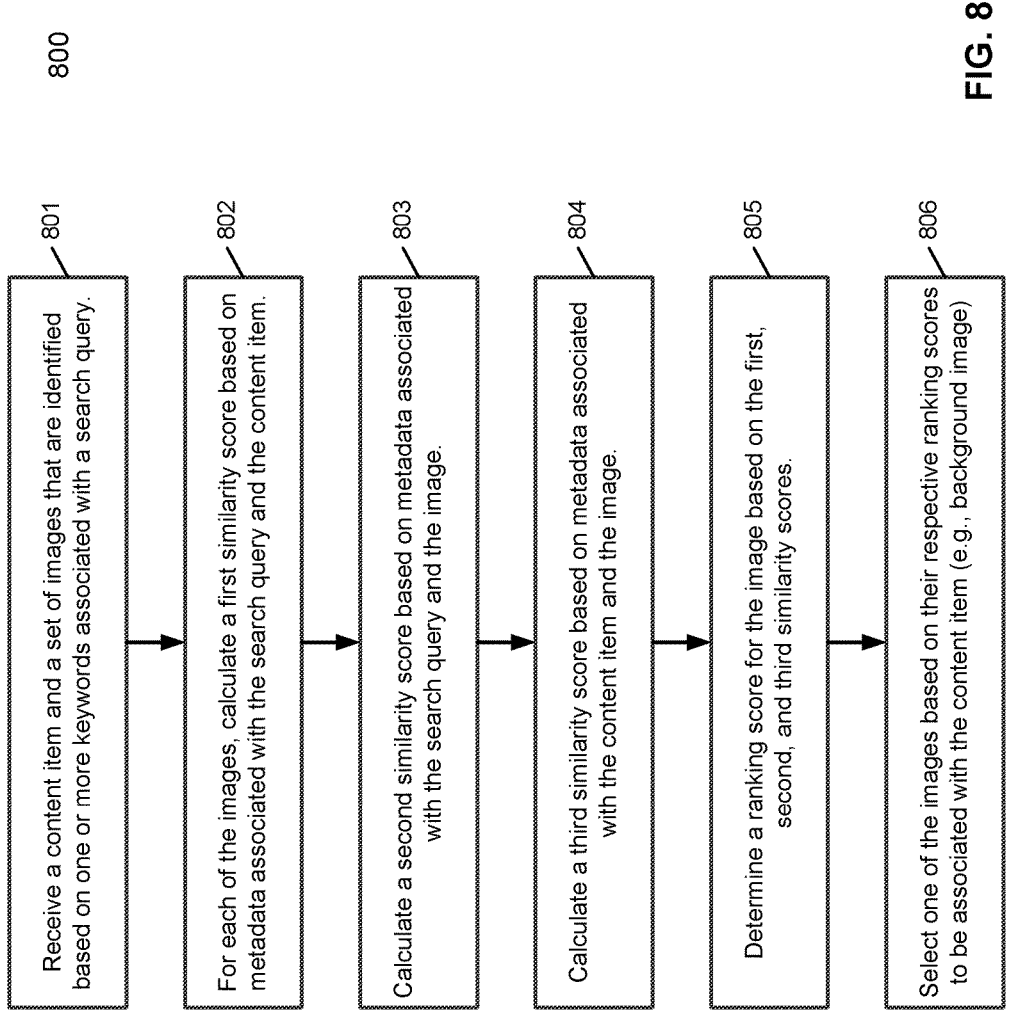
FIG. 8 is a flow diagram illustrating a process for ranking images for matching with content items according one embodiment of the invention.

FIG. 8 is a flow diagram illustrating a process for ranking images for matching with content items according one embodiment of the invention. Process 800 may be performed by processing logic which may include software, hardware, or a combination thereof. For example, process 800 may be performed by system 400 of FIG. 4. Referring to FIG. 8, at block 801, processing logic identifies a content item a list of one or more images as image candidates based on one or more keywords of a search query. For each of the images, at block 802, processing logic calculates a first similarity score based on metadata associated with the search query and the content item. At block 803, processing logic calculates a second similarity score based on metadata associated with the search query and the image. At block 804, the processing logic calculates a third similarity score based on metadata associated with the content item and the image. At block 805, processing logic determines a ranking score for the image to be matched with the content item based on the first similarity score, the second similarity score, and the third similarity score. At block 806, one of the images is selected based on the ranking scores to be matched with the content item.

Figure 9:
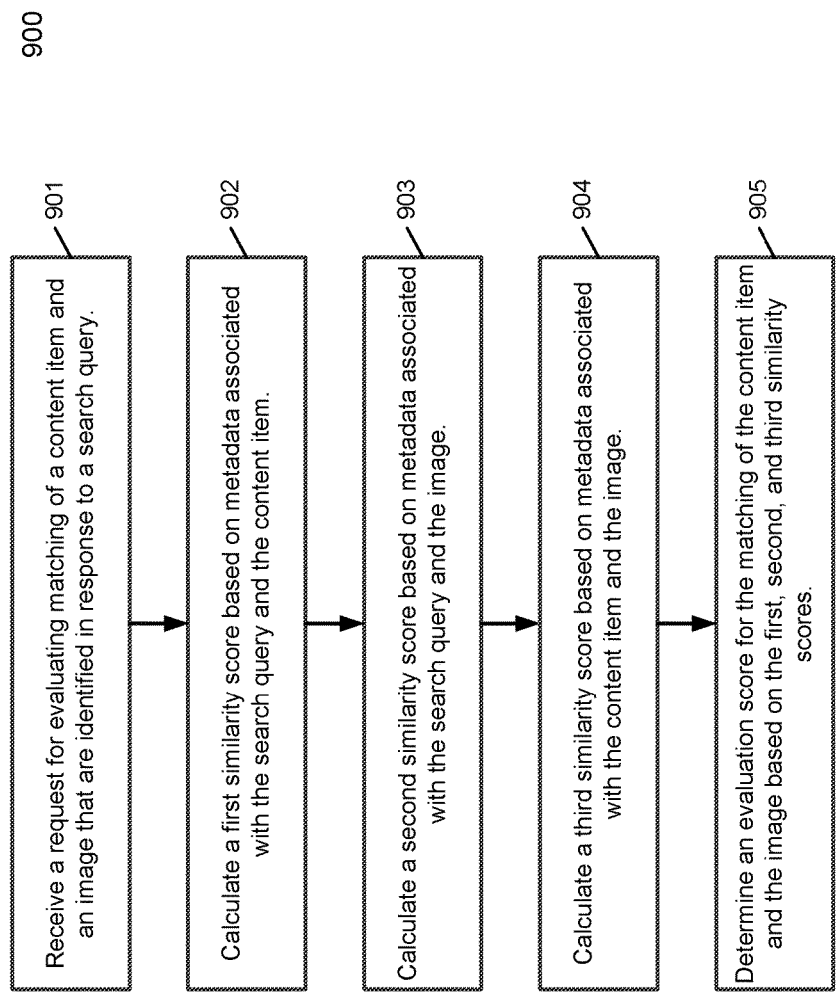
FIG. 9 is a flow diagram illustrating a process for evaluating matchings of content items and images according one embodiment of the invention.

FIG. 9 is a flow diagram illustrating a process for evaluating matchings of content items and images according one embodiment of the invention. Process 900 may be performed by processing logic which may include software, hardware, or a combination thereof. For example, process 900 may be performed by system 700 of FIG. 7. Referring to FIG. 9, at block 901, processing logic receives a request for evaluating matching of a content item and an image that are identified in response to a search query. At block 902, processing logic calculates a first similarity score based on metadata associated with the search query and the content item. At block 903, processing logic calculates a second similarity score based on metadata associated with the search query and the image. At block 904, the processing logic calculates a third similarity score based on metadata associated with the content item and the image. At block 905, processing logic determines an evaluation score for the image matched with the content item based on the first similarity score, the second similarity score, and the third similarity score.

The techniques described above can be applied to matching images with sponsored content. One type of the sponsored content is advertisement (Ads). For example, referring back to FIGS. 1A-1B, content database (DB) or server 133 may be an Ads database or Ads server. Each of the content items, e.g., Ads, is associated with a list of predefined keywords, terms, phrases, or sentences. These predefined keywords, terms, phrases, or sentences may be bidwords purchased, defined or specified by an Ads provider. In another embodiment, primary content DB 130 may store the general content generally available in a public network. Auxiliary content DB 131 may be an Ads DB. Some of the Ads may be just plain texts. By matching and integrating an image with the Ads, for example, as a background image, the Ads may be more appealing or attractive to users. Server 104 may be a Web server for searching content or alternatively, server 104 may be an Ads server.

Figure 10:
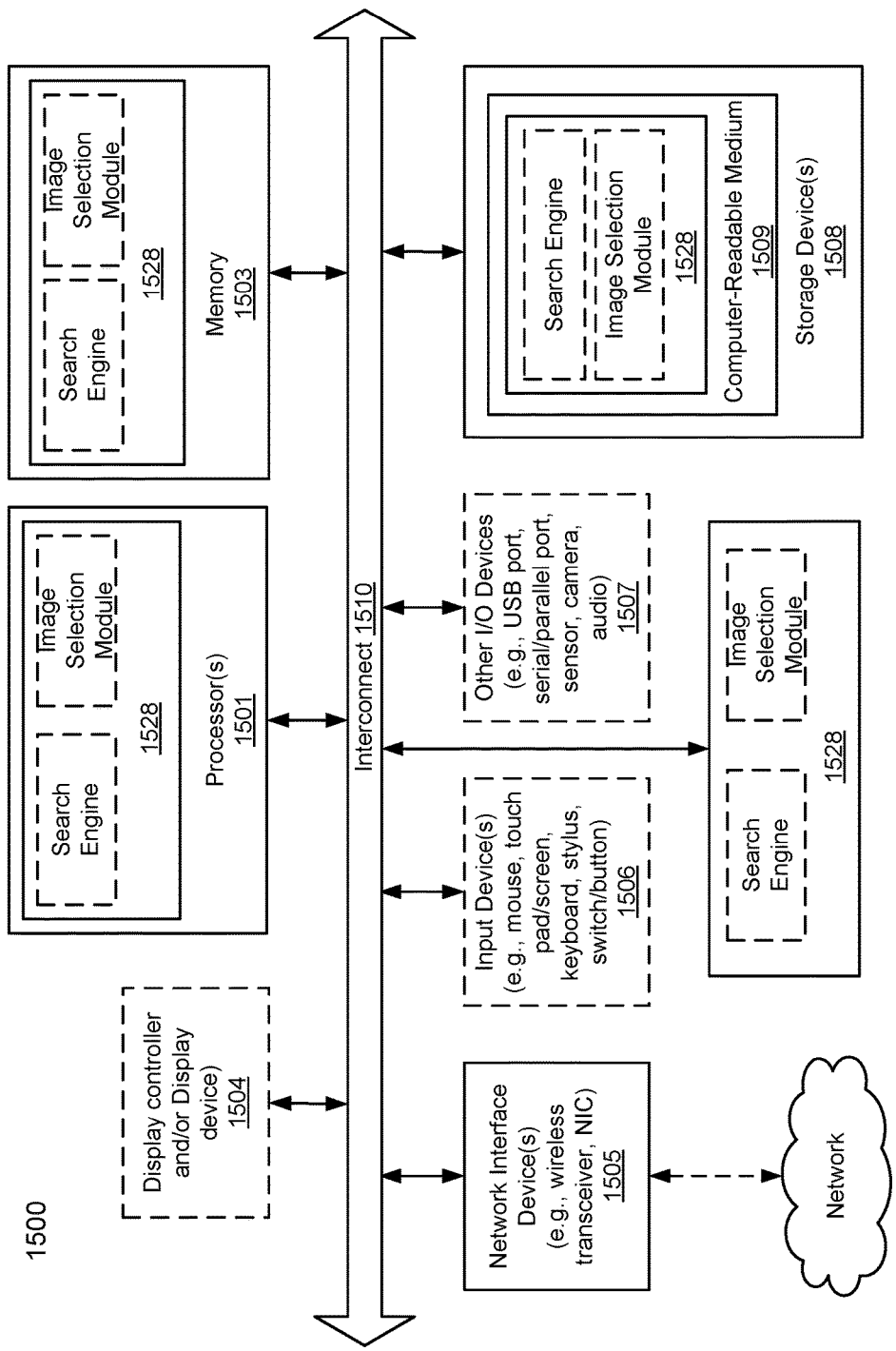
FIG. 10 is a block diagram illustrating a data processing system according to one embodiment.

FIG. 10 is a block diagram illustrating an example of a data processing system which may be used with one embodiment of the invention. For example, system 1500 may represents any of data processing systems described above performing any of the processes or methods described above, such as, for example, a client device or a server described above, such as, for example, client devices 101-102, server 104, content server 133, analytics system/server 150, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for evaluating matching of content items with images, the method comprising:
   receiving a request for evaluating matching between a content item and an image that were identified and selected from a plurality of content items and images in response to a search query;
   obtaining first metadata associated with the content item, second metadata associated with the image, and third metadata associated with the search query, wherein the third metadata comprises keywords of the search query;
   determining a first similarity score, "QC", based on the first metadata associated with the content item and the third metadata associated with the search query, wherein QC represents a similarity between the search query and the content item;

determining a second similarity score, "QI", based on the second metadata associated with the image and the third metadata associated with the search query, where QI represents a similarity between the search query and the image;

determining a third similarity score, "CI", based on the first metadata associated with the content item and the second metadata associated with the image, wherein CI represents a similarity between the content item and the image;

calculating an evaluation score for matching of the content item and the image in view of the search query, wherein the evaluation score is an average of: a product of the first similarity score and the second similarity score, a product of the first similarity score and the third similarity score, and a product of the second similarity score and the third similarity score;

integrating the content item and the image, based on the evaluation score; and returning the integrated content item and image in response to the search query.

2. The method of claim 1, wherein determining a first similarity score based on the first metadata associated with the content item and the third metadata associated with the search query comprises:

determining a first set of one or more keywords associated with the content item;

determining a third set of one or more keywords associated with the search query; and performing a first probabilistic latent semantic analysis on the first set and the third set of keywords to generate the first similarity score.

3. The method of claim 2, wherein the first set of keywords are obtained based on a title, description, and a landing page of the content item.

4. The method of claim 1, wherein determining a second similarity score based on the second metadata associated with the image and the third metadata associated with the search query comprises:

determining a second set of one or more keywords associated with the image;

determining a third set of one or more keywords associated with the search query; and performing a second probabilistic latent semantic analysis on the second set and the third set of keywords to generate the second similarity score.

5. The method of claim 4, wherein the second set of keywords are obtained based on a title of the image, an object or description recognized from the image, and a source from which the image was obtained.

6. The method of claim 1, wherein the product of the first similarity score and the second similarity score is $S_{QUERY}=QC^{\delta 1}*QI^{\delta 2}$, the product of the first similarity score and the third similarity score is $S_{CONTENT}=QC^{\delta 1}*CI^{\delta 3}$, the product of the second similarity score and the third similarity score is a $S_{IMAGE}=QI^{\delta 2}*CI^{\delta 3}$, wherein $\delta 1$, $\delta 2$, and $\delta 3$ are coefficients or weighting factors; the method further comprising determining the evaluation score for matching the content item with each of a plurality of images returned from the query, and associating the content item with the image in the plurality of images having the highest evaluation score.

7. The method of claim 1, wherein determining a third similarity score based on the first metadata associated with the content item and the second metadata associated with the image comprises:

determining a first set of one or more keywords associated with the content item;

determining a second set of one or more keywords associated with the image; and performing a third probabilistic latent semantic analysis on the first set and the second set of keywords to generate the third similarity score.

8. The method of claim 1, wherein the content item and the image were identified and selected using a predetermined selection method in response to the search query, and wherein the evaluation score is utilized to adjust the predetermined selection method for selecting the subsequent content items and images.

9. A non-transitory machine-readable medium having instructions stored therein, which when executed by a processor, cause the processor to perform operations of evaluating matching of content items with images, the operations comprising:

receiving a request for evaluating matching between a content item and an image that were identified and selected from a plurality of content items and images in response to a search query;

obtaining first metadata associated with the content item, second metadata associated with the image, and third metadata associated with the search query, wherein the third metadata comprises keywords of the search query;

determining a first similarity score, "QC", based on the first metadata associated with the content item and the third metadata associated with the search query, wherein QC represents a similarity between the search query and the content item;

determining a second similarity score, "QI", based on the second metadata associated with the image and the third metadata associated with the search query, where QI represents a similarity between the search query and the image;

determining a third similarity score, "CI", based on the first metadata associated with the content item and the second metadata associated with the image, wherein CI represents a similarity between the content item and the image;

calculating an evaluation score for matching of the content item and the image in view of the search query, wherein the evaluation score is an average of: a product of the first similarity score and the second similarity score, a product of the first similarity score and the third similarity score, and a product of the second similarity score and the third similarity score;

integrating the content item and the image, based on the evaluation score; and returning the integrated content item and image in response to the search query.

10. The machine-readable medium of claim 9, wherein determining a first similarity score based on the first metadata associated with the content item and the third metadata associated with the search query comprises:

determining a first set of one or more keywords associated with the content item;

determining a third set of one or more keywords associated with the search query; and performing a first probabilistic latent semantic analysis on the first set and the third set of keywords to generate the first similarity score.

11. The machine-readable medium of claim 10, wherein the first set of keywords are obtained based on a title, description, and a landing page of the content item.

12. The machine-readable medium of claim 9, wherein determining a second similarity score based on the second metadata associated with the image and the third metadata associated with the search query comprises:
  determining a second set of one or more keywords associated with the image;
  determining a third set of one or more keywords associated with the search query; and
  performing a second probabilistic latent semantic analysis on the second set and the third set of keywords to generate the second similarity score.

13. The machine-readable medium of claim 12, wherein the second set of keywords are obtained based on a title of the image, an object or description recognized from the image, and a source from which the image was obtained.

14. The machine-readable medium of claim 9, wherein the product of the first similarity score and the second similarity score is $S_{QUERY}=QC^{\delta 1}*QI^{\delta 2}$, the product of the first similarity score and the third similarity score is $S_{CONTENT}=QC^{\delta 1}*CI^{\delta 3}$, the product of the second similarity score and the third similarity score is a $S_{IMAGE}=QI^{\delta 2}*CI^{\delta 3}$, wherein $\delta 1$, $\delta 2$, and $\delta 3$ are coefficients or weighting factors; and wherein the operations further comprise determining the evaluation score for matching the content item with each of a plurality of images returned from the search query, and associating the content item with the image in the plurality of images having the highest evaluation score.

15. The machine-readable medium of claim 9, wherein determining a third similarity score based on the first metadata associated with the content item and the second metadata associated with the image comprises:
  determining a first set of one or more keywords associated with the content item;
  determining a second set of one or more keywords associated with the image; and
  performing a third probabilistic latent semantic analysis on the first set and the second set of keywords to generate the third similarity score.

16. The machine-readable medium of claim 9, wherein the content item and the image were identified and selected using a predetermined selection method in response to the search query, and wherein the evaluation score is utilized to adjust the predetermined selection method for selecting the subsequent content items and images.

17. A data processing system, comprising:
  a processor; and
  a memory coupled to the processor to store instructions, which when executed by the processor, cause the processor to perform operations, the operations including
  receiving a request for evaluating matching between a content item and an image that were identified and selected from a plurality of content items and images in response to a search query;
  obtaining first metadata associated with the content item, second metadata associated with the image, and third metadata associated with the search query;
  determining a first similarity score, "QC", based on the first metadata associated with the content item and the third metadata associated with the search query, wherein QC represents a similarity between the search query and the content item;
  determining a second similarity score, "QI", based on the second metadata associated with the image and the third metadata associated with the search query, where QI represents a similarity between the search query and the image;
  determining a third similarity score, "CI", based on the first metadata associated with the content item and the second metadata associated with the image, wherein CI represents a similarity between the content item and the image;
  calculating an evaluation score for matching of the content item and the image in view of the search query, wherein a ranking score for the search query is $S_{QUERY}=QC^{\delta 1}*QI^{\delta 2}$, a ranking score for the content item is $S_{CONTENT}=QC^{\delta 1}*CI^{\delta 3}$, a ranking score for the $S_{IMAGE}=QI^{\delta 2}*CI^{\delta 3}$, wherein $\delta 1$, $\delta 2$, and $\delta 3$ are coefficients or weighting factors, and the evaluation score is calculated as $S_{QUERY}+S_{CONTENT}+S_{IMAGE}$) divided by 3;
  integrating the content item and the image, based on the evaluation score; and
  returning the integrated content item and image in response to the search query.

18. The system of claim 17, wherein determining a first similarity score based on the first metadata associated with the content item and the third metadata associated with the search query comprises:
  determining a first set of one or more keywords associated with the content item;
  determining a third set of one or more keywords associated with the search query; and
  performing a first probabilistic latent semantic analysis on the first set and the third set of keywords to generate the first similarity score.

19. The system of claim 18, wherein the first set of keywords are obtained based on a title, description, and a landing page of the content item.

20. The system of claim 17, wherein determining a second similarity score based on the second metadata associated with the image and the third metadata associated with the search query comprises:
  determining a second set of one or more keywords associated with the image;
  determining a third set of one or more keywords associated with the search query; and
  performing a second probabilistic latent semantic analysis on the second set and the third set of keywords to generate the second similarity score.

21. A computer-implemented method for matching content items with images, the method comprising:
  receiving a content item and a plurality of images that have been identified in response to a search query;
  for each of the plurality of images,
    determining a first similarity score based on first metadata associated with the content item and third metadata associated with the search query;
    determining a second similarity score based on second metadata associated with the image and the third metadata associated with the search query,
    determining a third similarity score based on the first metadata associated with the content item and the second metadata associated with the image, and
    calculating a ranking score for the image based on an average of: a product of the first similarity score and the second similarity score, a product of the second similarity score and the third similarity score, and a product of the second similarity score and the third similarity score;
  ranking the plurality of images based on ranking scores of the image to select one of the images to be associated with the content item;
  integrating the selected image and the content item; and
  returning the integrated selected image and content item in response to the search query.

22. The method of claim 21, wherein determining a first similarity score based on the first metadata of the content item and the third metadata associated with the search query comprises:
 determining a first set of one or more keywords associated with the content item;
 determining a third set of one or more keywords associated with the search query; and
 performing a first probabilistic latent semantic analysis on the first set and the third set of keywords to generate the first similarity score.

23. The method of claim 22, wherein the first set of keywords are obtained based on a title, description, and a landing page of the content item.

24. The method of claim 21, wherein determining a second similarity score based on the second metadata associated with the image and the third metadata associated with the search query comprises:
 determining a second set of one or more keywords associated with the image;
 determining a third set of one or more keywords associated with the search query; and
 performing a second probabilistic latent semantic analysis on the second set and the third set of keywords to generate the second similarity score.

25. The method of claim 24, wherein the second set of keywords are obtained based on a title of the image, an object or description recognized from the image, and a source from the image was obtained.

26. The method of claim 21, wherein the product of the first similarity score and the second similarity score is $S_{QUERY}=QC^{\delta 1}*QI^{\delta 2}$, the product of the first similarity score and the third similarity score is $S_{CONTENT}=QC^{\delta 1}*CI^{\delta 3}$, the product of the second similarity score and the third similarity score is a $S_{IMAGE}=QI^{\delta 2}*CI^{\delta 3}$, wherein $\delta 1$, $\delta 2$, and $\delta 3$ are coefficients or weighting factors.

27. The method of claim 21, wherein determining a third similarity score based on the first metadata associated with the content item and the second metadata associated with the image comprises:
 determining a first set of one or more keywords associated with the content item;
 determining a second set of one or more keywords associated with the image; and
 performing a third probabilistic latent semantic analysis on the first set and the second set of keywords to generate the third similarity score.

* * * * *